(12) United States Patent
Hieser et al.

(10) Patent No.: US 10,963,203 B2
(45) Date of Patent: Mar. 30, 2021

(54) COMPUTER-IMPLEMENTED METHOD AND SYSTEM FOR GENERATING A MOBILE APPLICATION FROM A DESKTOP APPLICATION

(71) Applicant: SCHNEIDER ELECTRIC INDUSTRIES SAS, Rueil-Malmaison (FR)

(72) Inventors: Alexander Hieser, Wertheim (DE); Marcus Zinn, Rodgau (DE); Michael Patri, Aschaffenburg (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 16/408,596

(22) Filed: May 10, 2019

(65) Prior Publication Data
US 2019/0347059 A1 Nov. 14, 2019

(30) Foreign Application Priority Data
May 14, 2018 (EP) ..................... 18172147

(51) Int. Cl.
*G06F 3/0481* (2013.01)
*G06F 3/14* (2006.01)
(Continued)

(52) U.S. Cl.
CPC .............. *G06F 3/14* (2013.01); *G06F 3/0481* (2013.01); *G06F 9/451* (2018.02); *G06K 9/00744* (2013.01); *G06K 9/6261* (2013.01)

(58) Field of Classification Search
CPC ............ G06F 3/14; G06F 3/0481; G06F 8/38; G06K 9/00744; G06K 9/6261
See application file for complete search history.

(56) References Cited

U.S. PATENT DOCUMENTS

| 8,160,564 B1 * | 4/2012 | Gunasekara | ....... H04N 21/8153 455/419 |
| 9,740,380 B1 * | 8/2017 | Bagrinovskiy | ......... G06F 9/452 |

(Continued)

*Primary Examiner* — Phenuel S Salomon
(74) *Attorney, Agent, or Firm* — Ladas & Parry, LLP; Malcolm J. MacDonald (57) ABSTRACT

The invention relates to a computer-implemented method and a system for generating a mobile application (MA) having an interactive graphic user interface (MUI) displayable on a display screen of a mobile device (MD) from a desktop application (DA) executed on a data processing device (DC). The system comprises: an image capture unit (SC) such as streamer client for capturing individual video images of a graphic user interface of the desktop application (DA) by means of a video stream; an image analysis unit (DUIA) for analyzing the video images by means of pattern recognition and for dividing the images into desktop image components (DFC, DCC, DGC), and for analyzing the desktop image components by means of pattern recognition and for capturing items of property information of the desktop image component; a transformation unit for transforming the desktop image components by mapping them onto predefined equivalent executable mobile device components, which are adapted to the size of the display screen of the mobile device, by means of the items of property information and/or pattern recognition information, a generator unit (MUIG) for generating the executable graphic user interface (MUI) of the mobile application (MA) from the associated mobile device components (MFC, MCC, MGC); a capture unit (EET) in the form of an event emitter tool for capturing a user interaction with one of the executable mobile device components (MFC, MCC, MGC) to transform the user interaction into corresponding image coordinates of the desktop application and to transmit the user interaction for execution of the associated desktop component (DFC, DCC, DGC) to the desktop application (DA), wherein as a reaction to the user interaction, an (Continued)

updated and/or new executable mobile device component for the mobile application is generated in running operation from an updated video image of the video stream.

14 Claims, 10 Drawing Sheets

(51) Int. Cl.
*G06F 9/451* (2018.01)
*G06K 9/00* (2006.01)
*G06K 9/62* (2006.01)

(56) References Cited

U.S. PATENT DOCUMENTS

| | | | |
|---|---|---|---|
| 10,432,681 B1* | 10/2019 | Kolomeitsev | H04L 65/604 |
| 2006/0161865 A1* | 7/2006 | Scott | G06F 9/445 |
| | | | 715/810 |
| 2006/0218191 A1* | 9/2006 | Gopalakrishnan | G06F 16/41 |
| 2008/0273755 A1* | 11/2008 | Hildreth | G06K 9/00375 |
| | | | 382/103 |
| 2011/0246904 A1* | 10/2011 | Pinto | G06F 9/452 |
| | | | 715/740 |
| 2012/0084713 A1* | 4/2012 | Desai | G06F 3/0481 |
| | | | 715/788 |
| 2012/0229499 A1 | 9/2012 | Tsao et al. | |
| 2014/0164944 A1* | 6/2014 | Sivakumar | G06F 16/9577 |
| | | | 715/746 |
| 2015/0296180 A1* | 10/2015 | Shi | H04N 7/15 |
| | | | 348/14.1 |
| 2018/0203674 A1* | 7/2018 | Dayanandan | G06F 8/10 |

* cited by examiner

4. generating submenu

Fig. 3d 3. generating main menu

Fig. 3c

| desktop component (type, designation) | desktop component (status) | selected mobile device component |
|---|---|---|
| application | application is visible | display of an empty application |
| application name | | top bar, side bar (with application name), greeting, health icon with application name splash screen with application name |
| menu | menu exists | side bar |
| menu points | menu point is selected | with submenus |
| selected point | toolbar exists | one is selected and opened |
| image symbol | submenu is identified | submenu point of the selected menu point is visible |
| toolbar | toolbar is visible | toolbar switch (or page, displaceable or ...able) |
| selected button | selected button | selected switch |
| focused button | active button | moved switch |
| switching status | button status | |
| tree view | expanded and closed menu points expanded functions for concealed menu point | e.g., expandable list components |
| diagram | is visible | image observer (scrollable, panable, zoomable) |

COMPUTER-IMPLEMENTED METHOD AND SYSTEM FOR GENERATING A MOBILE APPLICATION FROM A DESKTOP APPLICATION

The invention relates to a computer-implemented method for generating a mobile application having an interactive graphic user interface displayable on a display screen of a mobile device from a desktop application and to a system for carrying out the method.

A method and a system of the type mentioned at the outset are known from US 2014/0164944 A1. In the method, an enterprise-based application for use on a mobile device is derived by transformation of a user interface from an existing enterprise-based application, while the functionality of the enterprise-based application is maintained. The method comprises generating a plurality of classifications of non-mobile application views based on at least one component and generating a plurality of transformation filters, wherein each of the plurality of transformation filters is associated with one of the plurality of classifications. Furthermore, the selection of a view element from the plurality of nonmobile view elements and the identification of a selected classification from the plurality of classifications as corresponding to the selected nonmobile view element take place. A transformation filter selected from the plurality of the transformation filters is then applied to the selected nonmobile view element to generate a transformed element.

US 2012/0229499 A1 relates to a method for automatically converting an application view of a nonmobile computer platform into a view of a mobile application for use on a mobile device. The method comprises the conversion of the application view of the nonmobile computer platform into the view of the mobile application at least partially on the basis of differences between the nonmobile computer platform and the mobile device. The differences comprise one or more peripheral devices associated with the display capability.

A method and a device for controlling a desktop application using a mobile device are described in U.S. Pat. No. 8,160,564 B1. U.S. Pat. No. 8,160,564 B1 relates to the control of a desktop application executed on a desktop computer using a mobile device. In this case, the mobile device captures an image of the desktop application, in which a photo of a user interface displayed on the display screen of the desktop computer is recorded. Subsequently, items of information about functions and specifications of the desktop application are requested from the desktop computer by means of the mobile device. The desktop computer provides a bitmap representation of the desktop application and one or more user-manipulated options such as operating elements "play", "fast-forward", "rewind", inter alia, which are associated with the bitmap representation. The mobile device links the user-manipulated options to corresponding regions of the image. Operating elements can thus be assigned to provide a user a function for using the option.

The mobile device comprises image processing software, which is designed to request items of information about specifications which are linked to the desktop application. These items of information are mapped on the captured image. The image processing software is furthermore designed to link the options which are linked to the desktop application to a region of the mapping and the operating elements, so that a user can manipulate the desktop application via remote control.

Furthermore, the mobile device has command generator software to transform a user input on the mobile device into commands. These commands are transmitted to the desktop computer for processing and trigger actions in the desktop application.

The known method has the disadvantage that an image of the desktop application has to be recorded using the camera of the mobile device. For this purpose, it is absolutely necessary for the user of the mobile device to be located in the immediate vicinity of the desktop application, to be able to record an image thereof. Furthermore, it is to be noted that reactions of the desktop application to user inputs cannot be displayed directly on the user interface of the mobile device.

Furthermore, methods are known from the prior art, in which images of the desktop application are streamed on a mobile device, for example, by means of a remote desktop tool, and are displayed on a display screen of the mobile device.

Since the display screen of the mobile device is smaller in comparison to the desktop display screen, the streamed image is displayed either excessively small or excessively large on the smaller display screen.

If the image is displayed excessively large, only a small detail thereof is visible, so that the overview is lost and individual operating elements can no longer be used.

If the image of the desktop application is adapted to the dimension of the display screen of the mobile device, operating elements are then greatly reduced in size, so that the operation by an operator, for example, a manual operation on a touchscreen, is also not possible.

Furthermore, it is to be noted that desktop applications are typically not optimized for touchscreen inputs, so that even if the image of the desktop application were displayed on the mobile device, operation is cumbersome.

Proceeding therefrom, the present invention is based on the object of refining a method and a system of the type mentioned at the outset in such a way that the display of a desktop application on the display screen of a mobile device is improved and the operation of the desktop application by means of the mobile device is simplified.

The object is achieved according to the invention by a method having the features of claim 1, comprising the following method steps:

capturing individual images of a graphic user interface of the desktop application by means of a video stream, analyzing the images by means of pattern recognition and dividing the images into desktop image components, analyzing the desktop image components by means of pattern recognition and capturing items of property information of the desktop image components, transforming the desktop image components by mapping them onto predefined equivalent executable mobile device components, which are adapted to the size of the display screen of the mobile device, by means of the items of property information and/or pattern recognition information, generating the executable graphic user interface of the mobile application from the associated mobile device components, capturing a user interaction with one of the executable mobile device components, transforming the user interaction into corresponding image components of the desktop application, and transmitting the image coordinates for execution of the associated desktop component to the desktop application, wherein the user interaction is executed at the location of the image coordinates of the associated desktop component of the desktop application, and generating an updated and/or new executable mobile device component for the mobile application in running operation, i.e., "on-the-fly", from an updated video image of the video stream as a reaction to the preceding user interaction.

According to the invention, a graphic user interface of a mobile application is generated from a video stream, which represents an image of a graphic user interface of the desktop application.

It is provided in this case that interactions of the user are transmitted to the desktop application with the aid of the mobile application, and changes of the graphic user interface of the desktop application thus induced generate corresponding changes of the graphic user interface of the mobile application directly (on-the-fly).

According to one preferred embodiment, it is provided that the image is divided into desktop content areas in the form of application frames, menu areas, text areas, tree structure areas, list structure areas, and/or graphic areas as desktop image components, and user-manipulable desktop control components are identified in each of the desktop content areas as desktop image components, such as image symbols for files and programs (icons), buttons, scrollbars, toolbars, menu bars, and/or dialogue boxes, user-manipulable dynamic desktop function components such as tree structures and/or list structures and/or static desktop graphic components. The image analysis can be systematized and simplified by the above procedure.

The items of pattern recognition information and/or property information determined during the pattern recognition preferably contain items of information about a type, a status, a position, a designation, a text area, a chronological status change, and/or a precise size of the representation of the desktop image components on the desktop display screen.

The desktop image components identified by pattern recognition are preferably mapped by means of a mapping file such as a mapping matrix in consideration of the items of pattern recognition information and/or property information onto the predefined mobile device components.

The predefined mobile device components can be produced in the form of source code templates from basic image components, which are identified during an image analysis of images of various states of the graphic user interface of the desktop application.

The image analysis method is preferably carried out in steps building on one another. In a first step of the image analysis, a desktop content area is identified, for example, in the form of an application frame having application title. In a second step, the desktop control, desktop function, and/or desktop graphic element can be identified in the desktop content area. In a third step, the application frame having application title can then be transformed into an equivalent mobile device application frame having application title. Finally, in a fourth step, the identified desktop control, desktop function, and/or desktop graphic element can be transformed into an equivalent executable mobile device control, mobile device function, and/or mobile device graphic element.

The items of pattern recognition information and/or property information are preferably provided by a configuration file and can be loaded therefrom for a manual analysis and/or transformation and/or generation of unknown desktop image elements.

The analysis of the images, the transformation of the desktop image components, and/or generation of the mobile application are preferably executed by means of a processor unit in a computer device, a cloud environment, or in the mobile device itself The user interactions are preferably captured using the executable mobile device components of the mobile application and transformed by means of an event emitter tool and transmitted to the desktop application.

Furthermore, the invention relates to a data processing system for generating an interactive graphic user interface displayable on a display screen of a mobile device from a desktop application executed on a data processing device, comprising:

an image capture unit such as streamer client for capturing individual video images of a graphic user interface of the desktop application by means of a video stream;

an image analysis unit for analyzing the video images by means of pattern recognition and for dividing the images into desktop image components, and for analyzing the desktop image components by means of pattern recognition and for capturing items of property information of the desktop image components;

a transformation unit for transforming the desktop image components by mapping them onto predefined equivalent executable mobile device components adapted to the size of the display screen of the mobile device by means of the items of property information and/or pattern recognition information;

a generator unit for generating the executable graphic user interface of the mobile application from the associated mobile device components;

a capture unit in the form of an event emitter tool for capturing a user interaction with one of the executable mobile device components, transforming the user interaction into corresponding image coordinates of the desktop application, and for transmitting the image coordinates for executing the associated desktop component to the desktop application, wherein as a reaction to the user interaction, an updated and/or new executable mobile device component is generated for the mobile application in running operation, i.e., on-the-fly, from an updated video image of the video stream.

The data processing system can be installed in the mobile device or in a cloud environment.

The video stream is a sequence of individual images of the graphic user interface of the desktop application. A new image is generated by changing and/or updating the present graphic user interface, for example, by interaction. The images of the video stream are analyzed by means of an image analyzer. In the event of a change and/or update of the image, corresponding mobile device components of the graphic user interface of the mobile device are updated or newly generated.

Further details, advantages, and features of the invention result not only from the claims, the features which can be inferred therefrom per se and/or in combination, but rather also from the following description of the preferred exemplary embodiments to be inferred from the figures.

Figure 1:
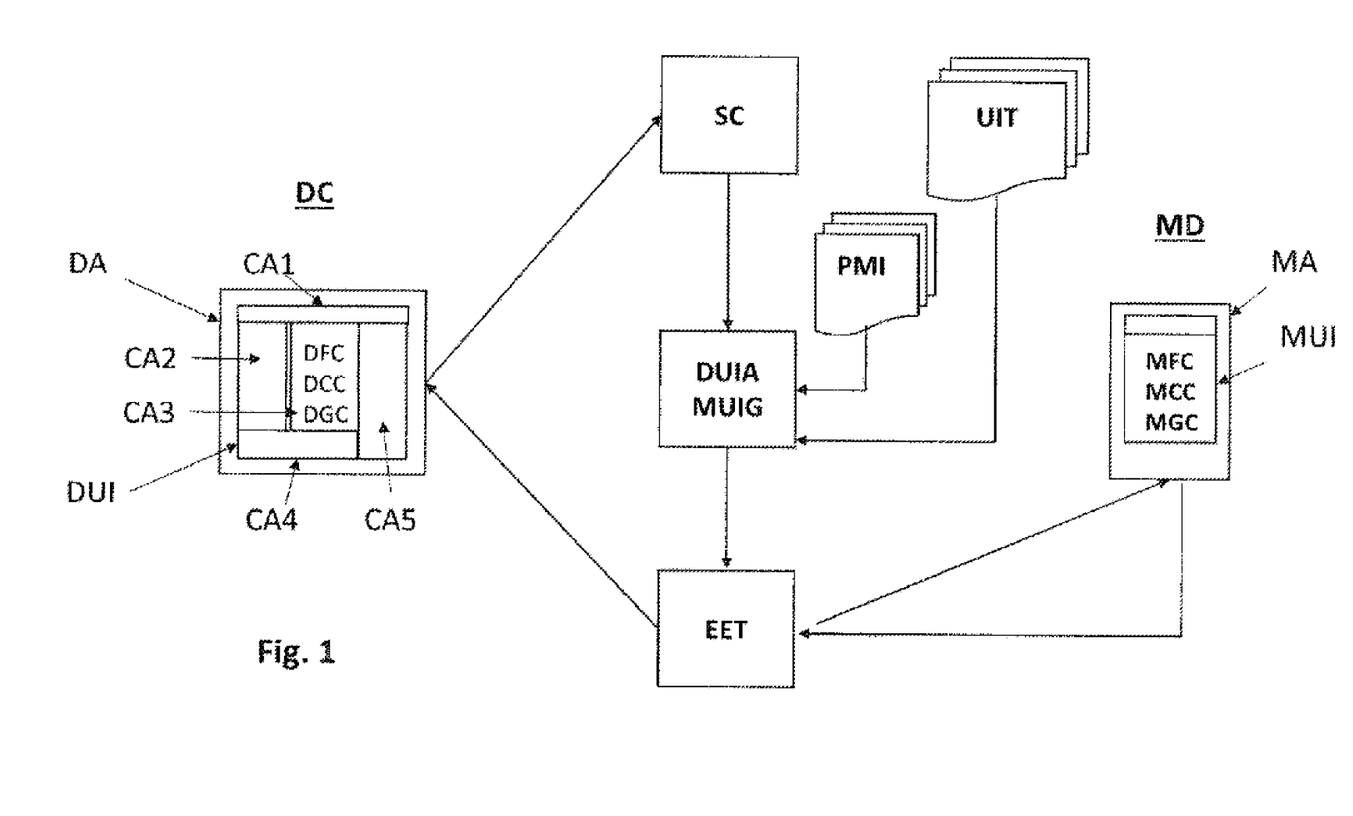
FIG. 1 shows a block diagram of a system for transforming the user interface of a desktop application into a mobile application of a mobile device in running operation (on-the-fly)

In the figures:

FIG. 1 shows, solely schematically, a system architecture in the form of a block diagram for the transformation of a graphic user interface DUI of a desktop application DA executed on a computer device such as desktop computer DC into a graphic user interface MUI of a mobile application MA, which is executed on a mobile device MD.

The graphic user interface DUI of the desktop application DA comprises desktop image components in the form of at least one desktop content area CA1 . . . CA5, for example, a menu area, a text area, a tree structure area, a list area, and/or a graphic area, wherein one or more desktop image components DC in the form of, for example, a desktop control component DCC such as a button, a desktop function component DFC such as a tree structure or list structure, and/or a desktop graphic component DGC can be contained in the at least one desktop content area CA1 . . . CA5.

The system furthermore comprises an image capture unit such as streaming client SC, which is designed to stream individual images of the graphic user interface DUI of the desktop application DA.

The streamed images are analyzed in an image analysis unit DUIA using image processing software to identify the desktop image components in the form of the desktop content areas CA1 . . . CA5 and to recognize the desktop control, desktop function, and desktop graphic components DCC, DFC, DGC within the desktop content areas CA1 . . . CA5 of the graphic user interface DUI.

The image analyzer DUIA is coupled to a first memory, in which files PMI having items of pattern recognition information for a pattern recognition and a pattern comparison are stored.

The patterns of the desktop content areas CA1 . . . CA5 and/or desktop components DCC, DFC, DGC identified in the graphic user interface DUI are further analyzed in consideration of the items of pattern recognition information to obtain items of property information of the desktop content areas and/or desktop components.

The identified desktop content areas and/or desktop components are mapped by means of a mapping file in consideration of the items of pattern recognition and/or property information onto equivalent mobile device components MCC, MFC, MGC adapted to the size of the display screen MUI. The predefined mobile device components are stored as a source code template in a memory UIT.

The executable graphic user interface MUI of the mobile application MA is generated from the equivalent executable mobile device components MCC, MFC, MGC by means of an image generator MUIG.

Furthermore, an event emitter tool EET is provided, which captures inputs or actions of a user on a touch display of the mobile device MD and transmits them to the desktop application DA.

The streaming client SC, the image analyzer DUIA, the image generator MUIG, and the event emitter tool EET can be formed in the mobile device MD, the desktop computer DC, and/or as a cloud or web application.

Figure 2:
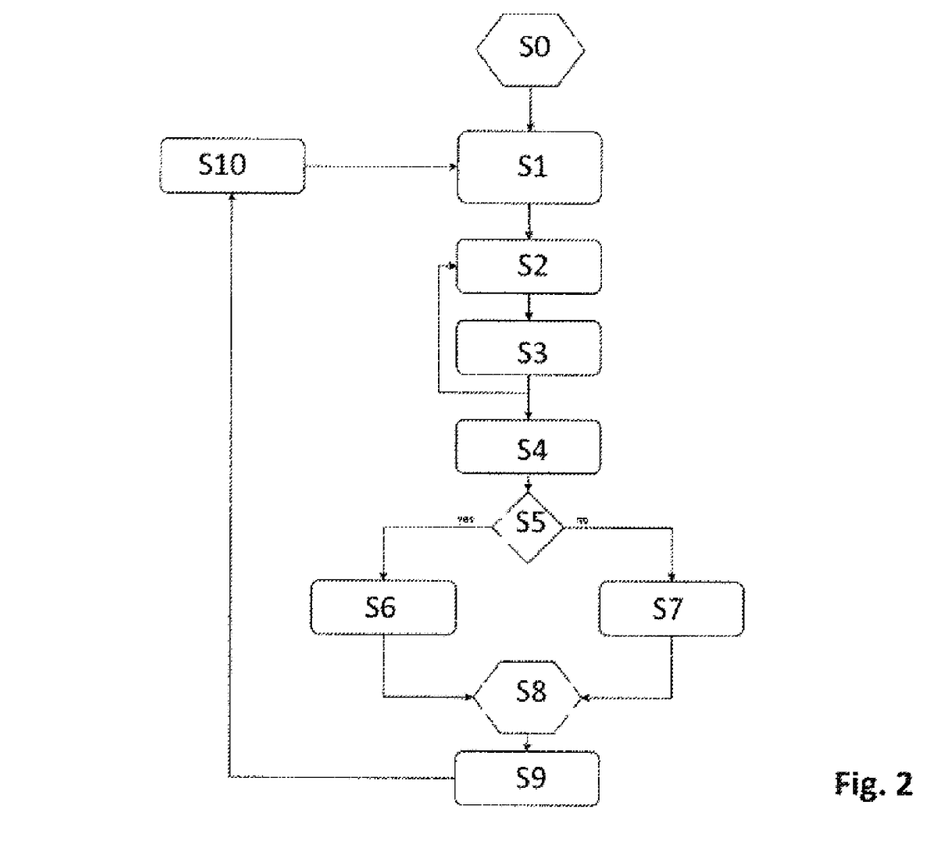
FIG. 2 shows a schematic flow chart of method steps for carrying out the method.

FIG. 2 shows a flow chart having a schematic procedure of the method according to the invention. In a method step S0, a video stream of the graphic user interface DUI of the desktop application DA is received by means of the streaming client SC. Images or frames are captured, for example, by means of a single image function from the video stream.

An image of the graphic user interface DUI is analyzed in a method step S1 in the image analyzer DUIA by means of image processing software.

Figure 3A:
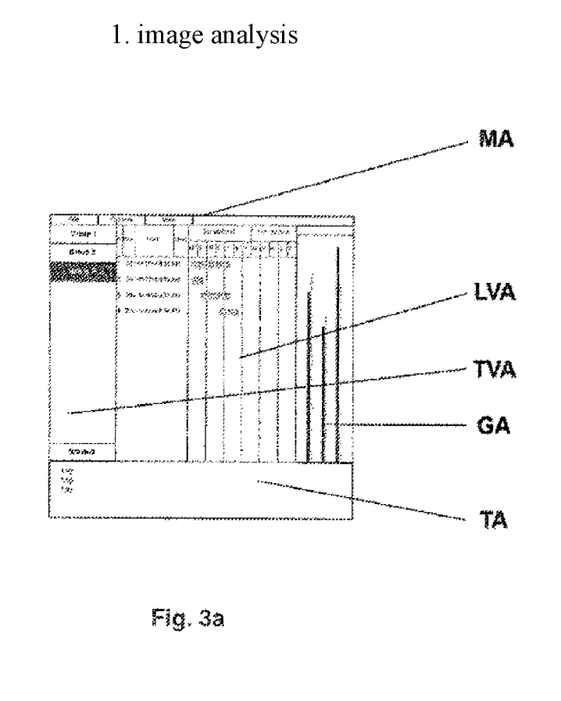
FIG. 3a shows method steps for the identification of desktop content areas of the graphic user interface of the desktop application.

According to FIG. 3a, the desktop image components are identified in the form of desktop content areas by pattern recognition in the image or frame of the graphic user interface DUI. The desktop content areas comprise, according to FIG. 3a, solely by way of example, a menu area MA, a list view area LVA, a tree view area TVA, a text area TA, and a graphic area GA.

In a method step S2, the identified desktop content areas MA, LVA, TVA, GA, TA are analyzed.

By means of pattern matching, user-manipulable desktop control components can be identified as desktop image components in each of the desktop content areas, such as image symbols for files and programs (icons), buttons, scrollbars, toolbars, menu bars, and/or dialogue boxes, user-manipulable dynamic desktop function components such as tree structures and/or list structures and/or static desktop graphic components.

Figure 3B:
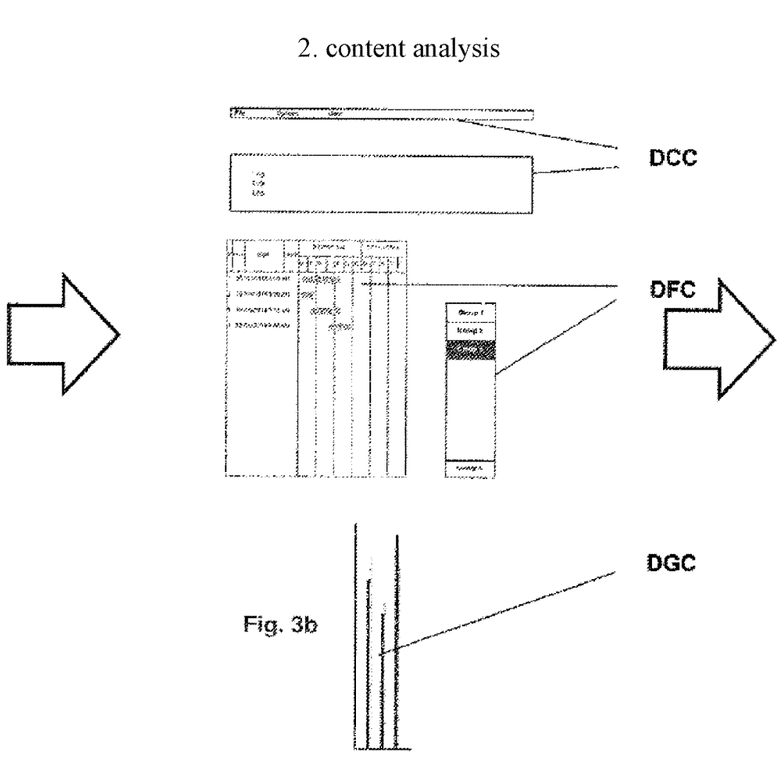
FIG. 3b shows method steps for the identification of desktop image components such as desktop control, desktop function, and/or desktop graphic components in the desktop content areas.

During the analysis of the content areas according to FIG. 3b, the items of property information of the desktop image components are determined in the form of items of information about a type, a status, a position, a designation, a text area, a chronological status change, and/or a precise size of the representation of the desktop image component on the desktop display screen.

The state of unknown portions or areas, for example, diagrams, images, etc., can also be captured by means of image matching (binary matching).

Figure 4:
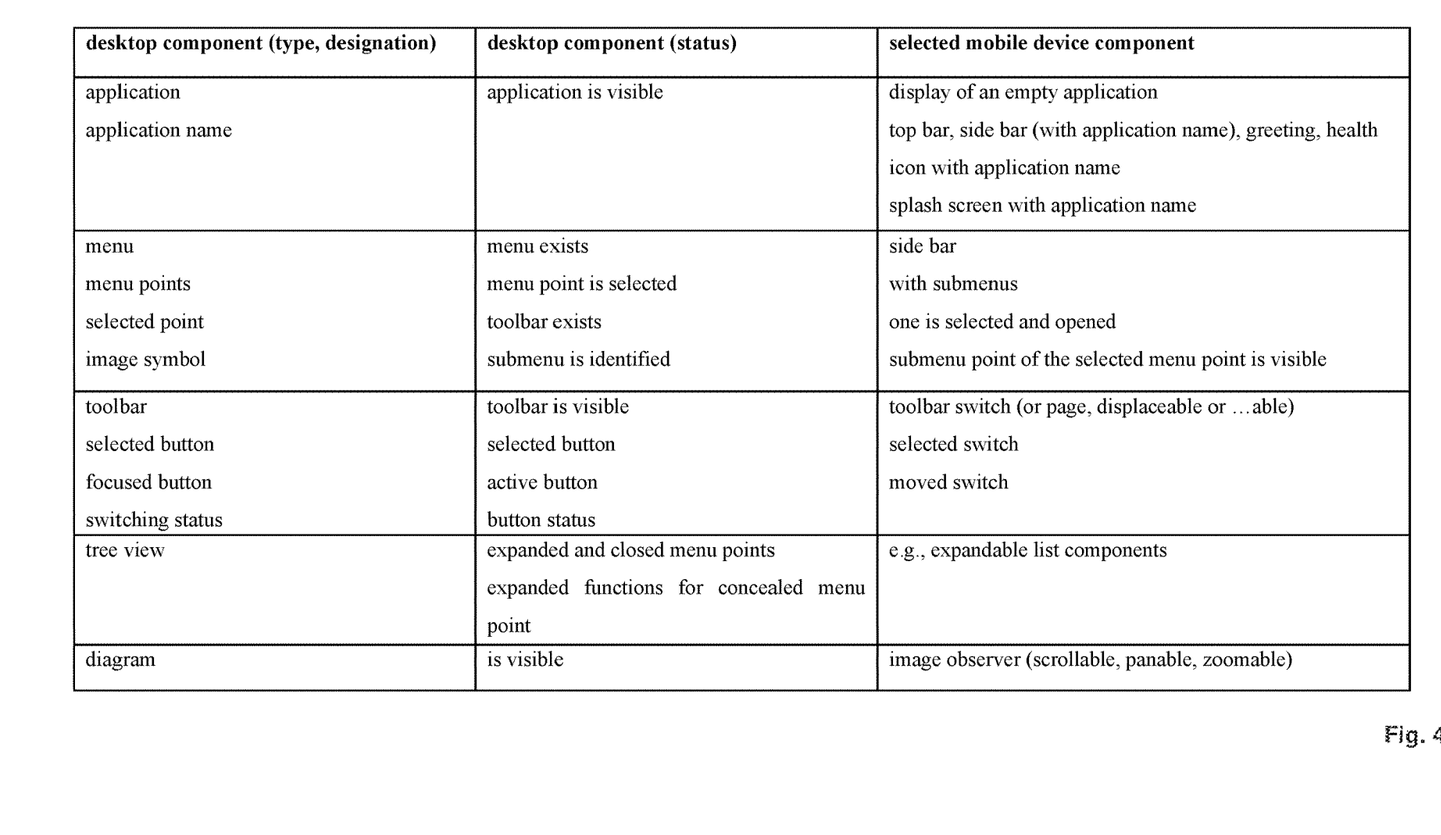
FIG. 4 shows a table having items of information on the transformation of a desktop content area or a desktop image component into an equivalent mobile device content area or an equivalent mobile device component.

By way of example, the items of property information in the form of type and status of the identified desktop content areas or desktop components DFC, DCC, DGC and equivalent mobile device components MFC, MCC, MGC are listed in a table according to FIG. 4. The table is used for associating and/or mapping the identified desktop components with the corresponding predefined mobile device components.

The following items of property information are thus available from method steps S1 and S2:
- type of the identified desktop content areas and desktop components,
- status of the identified desktop content areas and desktop components,
- position of the identified desktop content areas and desktop components of the desktop display screen,
- inscription and text areas,
- status and changes of control elements over time, and
- precise display screen size of the original display screen (desktop display screen).

In consideration of the above items of property information, an equivalent mobile device control, mobile device function, and/or mobile device graphic component MCC, MFC, MGC for the graphic user interface MUI of the mobile terminal MD can then be generated for each identified desktop image content area and/or for each identified desktop control, desktop function, and/or desktop graphic element.

In consideration of above-defined items of pattern recognition information for pattern and status capture and the items of property information, the equivalent and executable mobile device components MUIC can be selected from the source code templates UIT (user interface templates) stored in the library.

During the transformation of the identified content areas and/or the identified components DCC, DFC, and DGC into the equivalent mobile device components MCC, MFC, and MGC, an artifact (a model element for a result from a working process) in, for example, a XML/JSON language can be used, in which it is described which input, in the form of items of property information, a specific mobile device control, mobile device function, and/or mobile device graphic component MCC, MFC, MGC generates.

In method steps S3 and S4, the entire executable graphic user interface MUI of the mobile device is generated from the individual equivalent and/or specific mobile device control, function, and/or graphic components MCC, MFC, MGC, which are executable per se, and this interface can then be displayed on the display screen of the mobile device MD.

It is to be noted with respect to method step S4 that the generation of the graphic user interface MUI of the mobile device MD from the specific mobile device control, mobile device function, and/or mobile device graphic components MCC, MFC, MGC initially comprises the generation of a main menu view, which represents the application type, the name of the application, and the menu points of the desktop application.

Figure 3C:
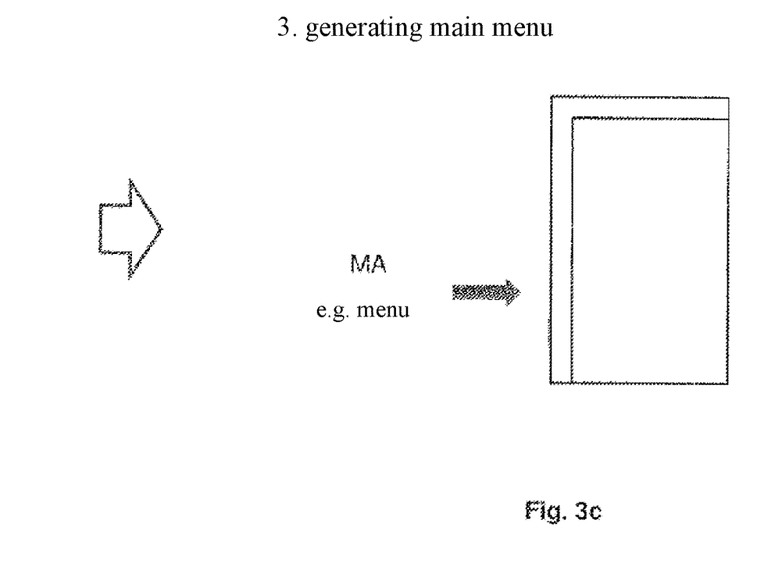
FIG. 3c shows method steps for the transformation of the desktop content areas into equivalent executable mobile device components adapted to the display screen of the mobile device, such as menu components of a main menu of the graphic user interface of the mobile application.

According to FIG. 3c, in this case in particular an initially empty mobile application having top bar, side bar, preferably having name of the application, and an image element having application name is generated.

Figure 3D:
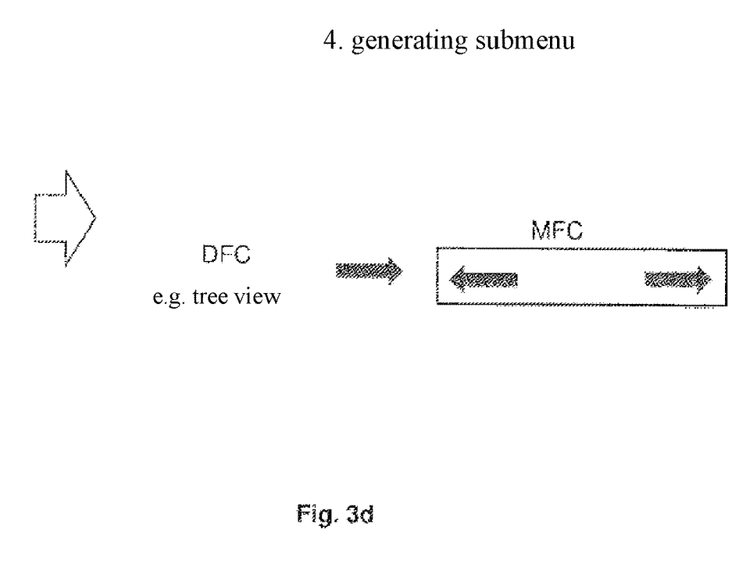
FIG. 3d shows method steps for the transformation of the desktop components such as desktop control, desktop function, and/or desktop graphic components into equivalent mobile device components such as mobile device control, mobile device function, and/or mobile device graphic components of a submenu of the graphic user interface of the mobile application.

It is shown in FIG. 3d how in a further step, submenus having specific mobile device control and mobile device function components MCC, MFC are then generated in the form of buttons, scrollbars, tree views, list views.

In method step S5, a query is performed as to whether the graphic user interface MUI of the mobile device MD was originally queried. If so, the generated graphic user interface MUI is loaded into the mobile device MD and/or displayed on the display screen, if the generation took place in the mobile device, in method step S6. Otherwise, in a method step S7, an update of an existing graphic user interface MUI takes place, which was already previously displayed on the display screen of the mobile device MD.

In a method step S8, user interactions such as actuation of operating elements or other user-manipulated inputs are captured by means of the event emitter tool EET and transformed in method step S9 and transmitted to the desktop application DA. It is established during the capture of the user interaction which mobile device component was actuated. In consideration of the items of pattern recognition information, the user interaction can be transformed into corresponding image coordinates for the equivalent desktop components on the display screen of the desktop application, so that an activation of the equivalent desktop component can be executed.

In method step S10, the user interactions are executed in the graphic user interface DUI of the desktop application DA, whereby the graphic user interface DUI of the desktop application DA changes.

Since the images of the graphic user interface DUI of the desktop application DA are streamed in method step S1 by means of the streaming client SC into the image analyzer, the image of the present graphic desktop user interface DUI is analyzed again after execution of the user interaction and on the basis of the analysis by method steps S2, S3, and S4, an updated graphic user interface MUI is generated for the mobile device MD. It is updated in the mobile device MD according to method step S6.

Figure 5:
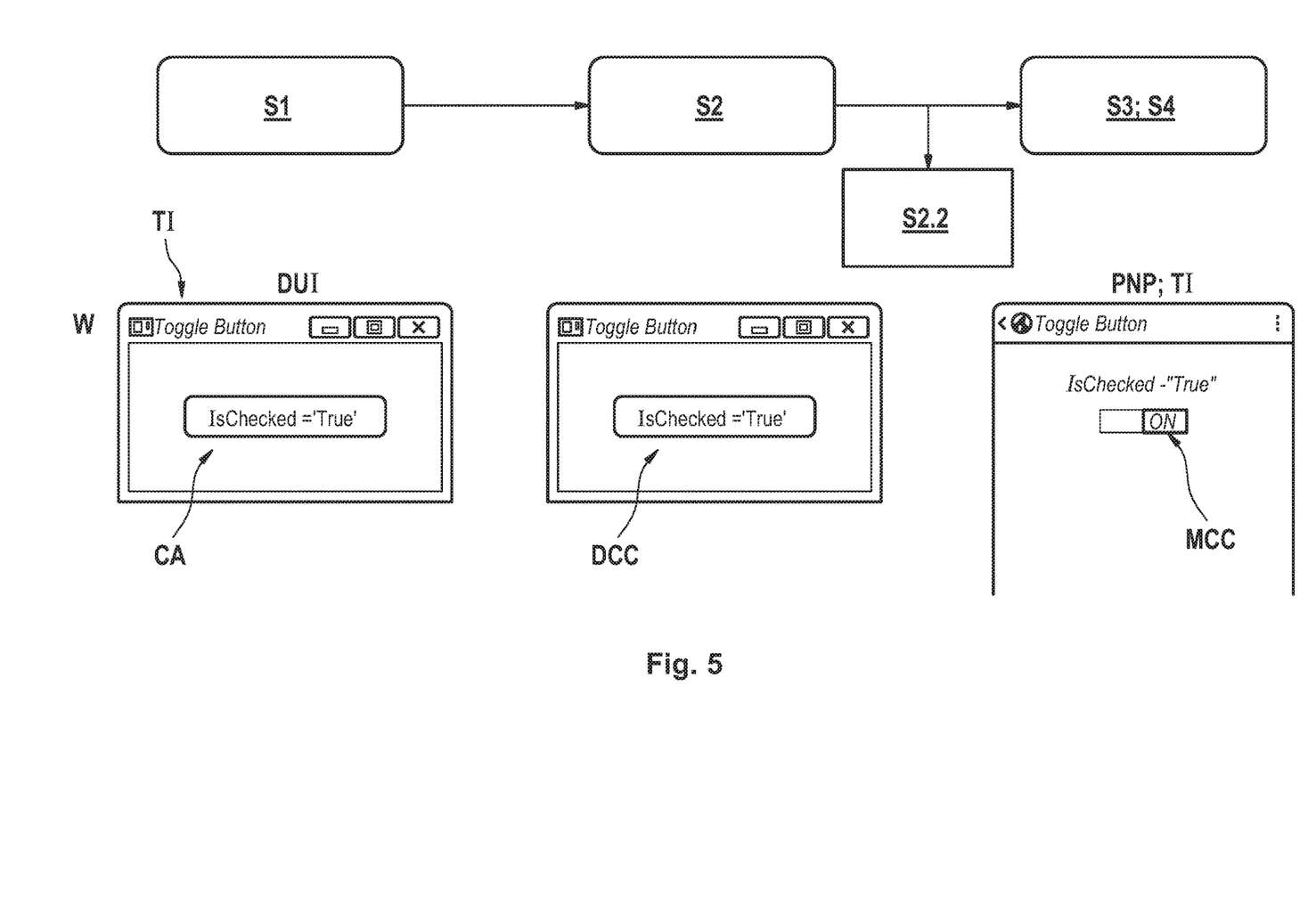
FIG. 5 shows method steps for the transformation of a desktop control component such as a button into a corresponding mobile device control component of the graphic user interface of the mobile application.

FIG. 5 shows, solely by way of example, method steps S1 to S4 for the transformation of a desktop control component DCC from the desktop content area CA into a corresponding mobile device control component MCC of the user interface MUI of the mobile application MA. In method step S1, an image of the graphic user interface DUI of the desktop application is analyzed. The illustrated example shows an open window W having the title TI "toggle button". In a content area CA to be examined, the control component DCC of the desktop application is shown.

In method step S2, the desktop content area CA is analyzed, whereby the desktop control component DCC is identified. Component matching is then performed in method step S2.2, which is shown in greater detail in FIG. 6.

Figure 6:
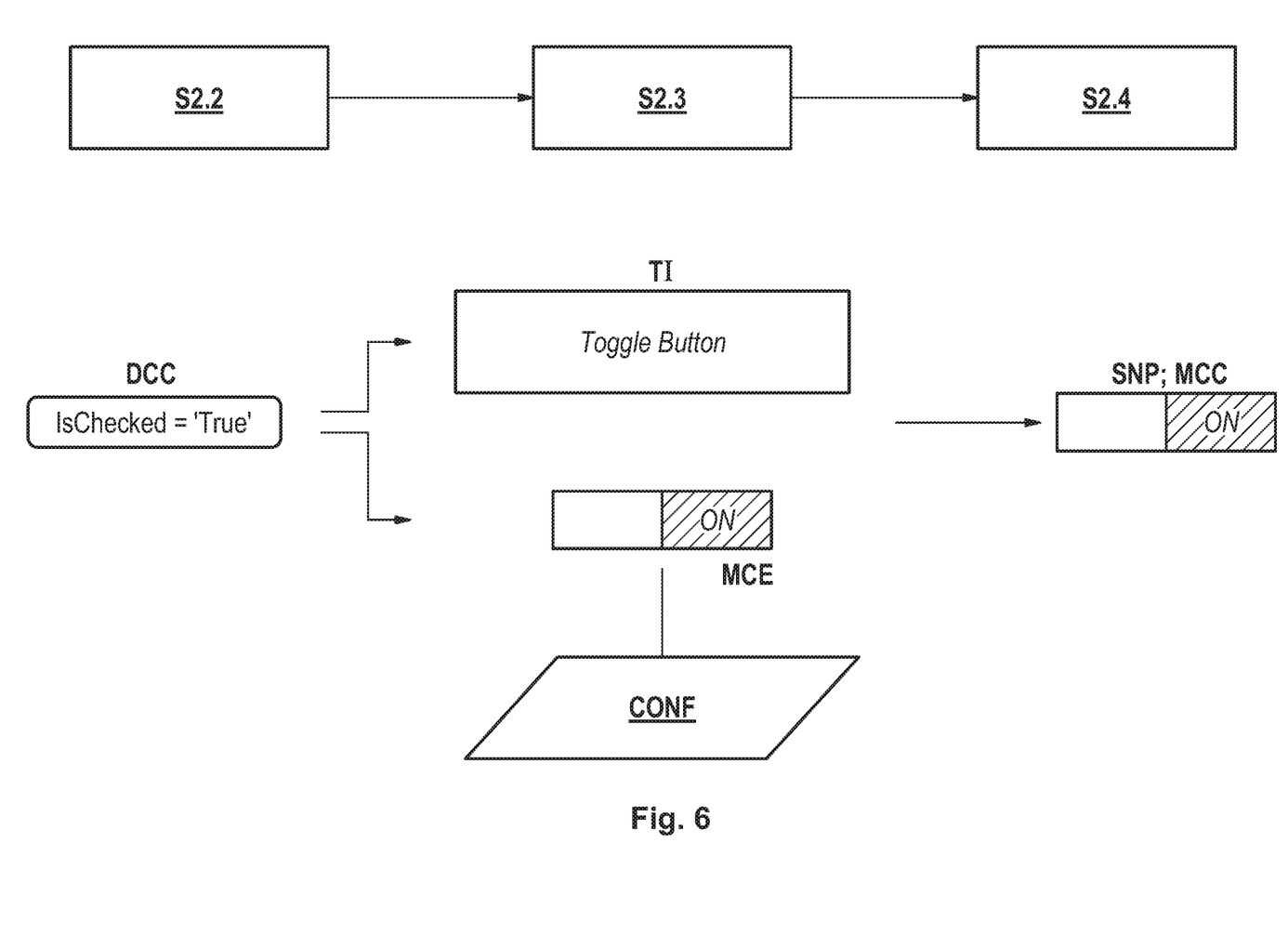
FIG. 6 shows method steps for the transformation of a desktop control component such as a button into a corresponding mobile device component on the basis of a configuration file.

The identified control component DCC is analyzed by means of pattern matching using the stored items of pattern recognition information PMI, to create a corresponding mobile device control component MCC for the graphic user interface MUI of the mobile device MD. The matching can be configured by means of a configuration file CONF. In addition to the mobile device control component MCC, the title TI "toggle button" of the application is also generated. According to method step S2.4, the text component and mobile device control component TI, MCC are selected based on the configuration file and displayed in the graphic user interface MUI of the mobile device MD, as previously explained in method steps S3 and S4.

Figure 7:
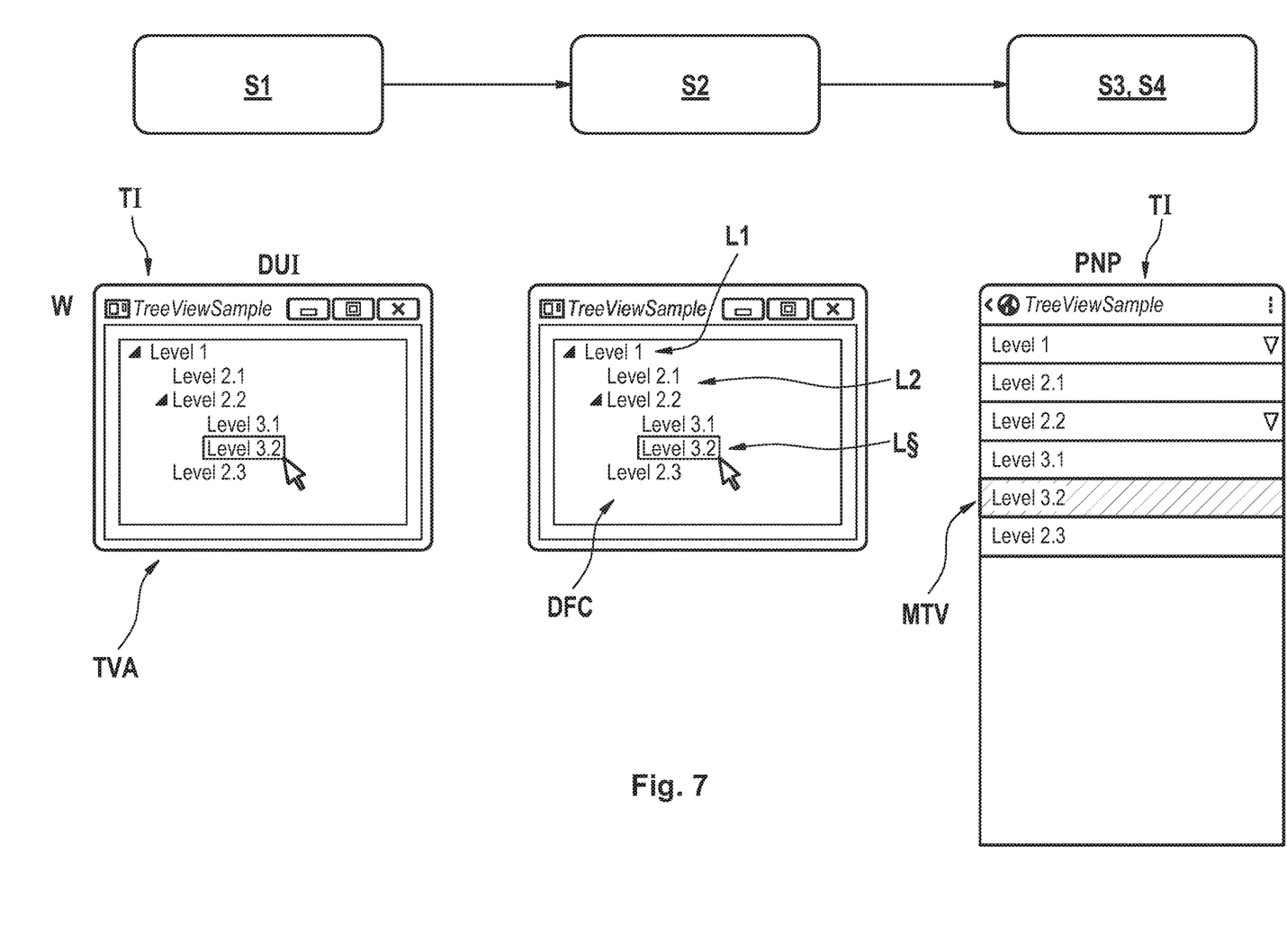
FIG. 7 shows method steps for the transformation of a desktop function component such as a tree view into a corresponding mobile device function component such as a list view of the mobile application.

FIG. 7 shows method steps S1 to S4 for the transformation of a desktop function component DFC such as a tree view component into a corresponding mobile device function component MFC of the mobile application MA. In method step S1, the window W of the graphic user interface DUI of the desktop application DA is analyzed, wherein the title TI "tree view sample" of the application and the content area TVA in the form of a tree view are identified. In method step S2, the content of the content area TVA is analyzed, wherein a tree view component DFC is recognized by means of pattern matching. The tree view component DFC shows multiple levels L1, L2, L3, wherein a selected level L3.2 is marked. From the items of information obtained by the analysis, firstly a mobile device main menu PNP in the form of a window having the title of the application and a menu structure is generated. The tree view component DFC of the desktop application DA is displayed in a mobile device submenu SNP in the form of the corresponding mobile device function component MFC as lists, in which the individual levels L1, . . . , L3 are arranged one over another.

Figure 8:
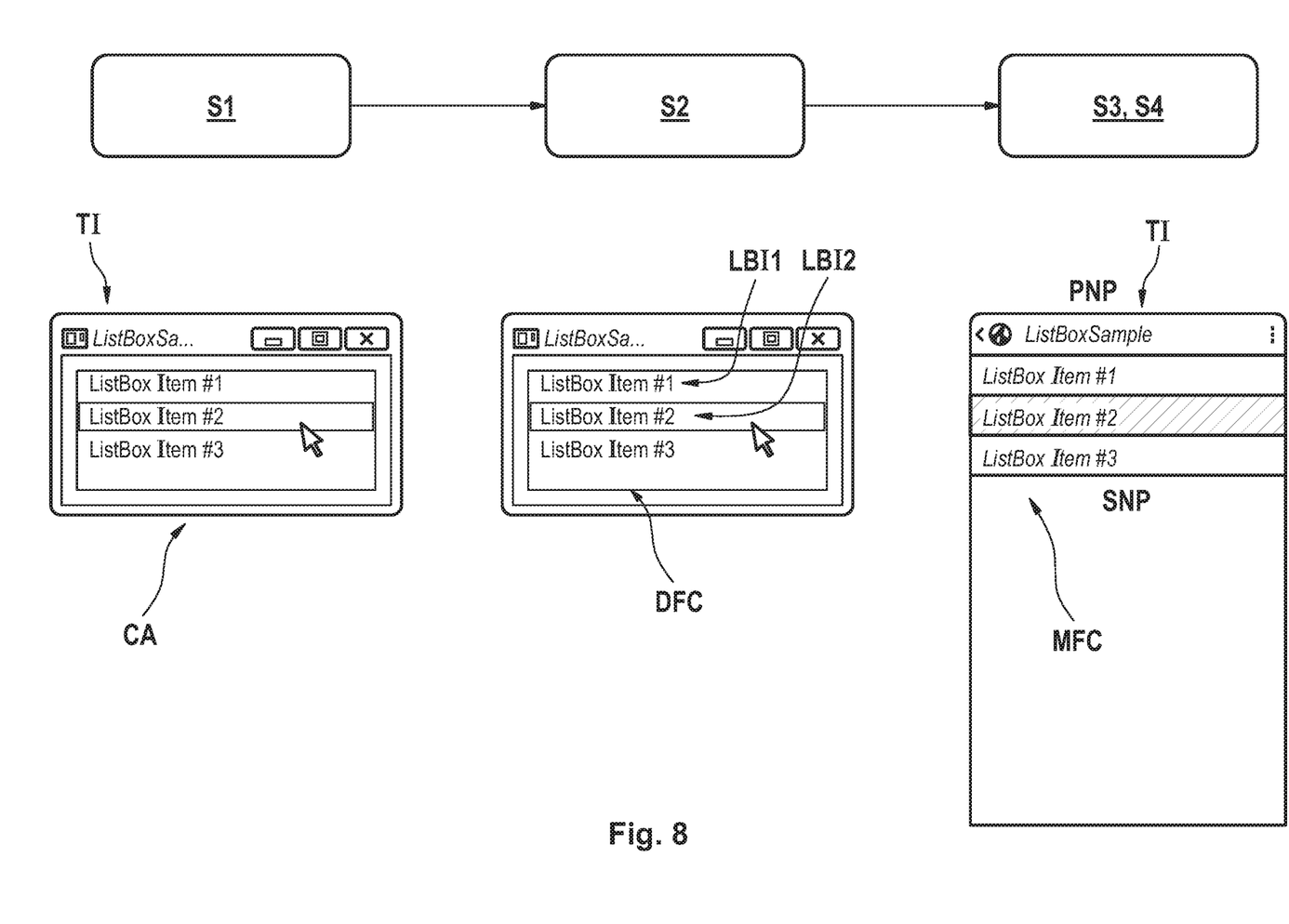
FIG. 8 shows method steps for the transformation of a desktop function component such as a list view into a corresponding mobile device function component such as a list view of the mobile application.

FIG. 8 shows method steps S1 to S4 for the transformation of a desktop function component DFC in the form of a list view component of the desktop application DA.

In method step S1, the analysis of the title TI "ListBox Sample" and an analysis of the content area CA take place.

In method step S2, the desktop function component DFC of the desktop application DA is identified and it is established which and how many list entries LBI1, . . . , LBI3 are present and whether selected list entries LBI2 are contained. In method steps S3 and S4, firstly the generation of a mobile main menu PNP having title TI and a mobile device submenu SNP having the list entries LBI1, . . . , LBI3 and the marked list entry LBI2 take place.

Figure 9:
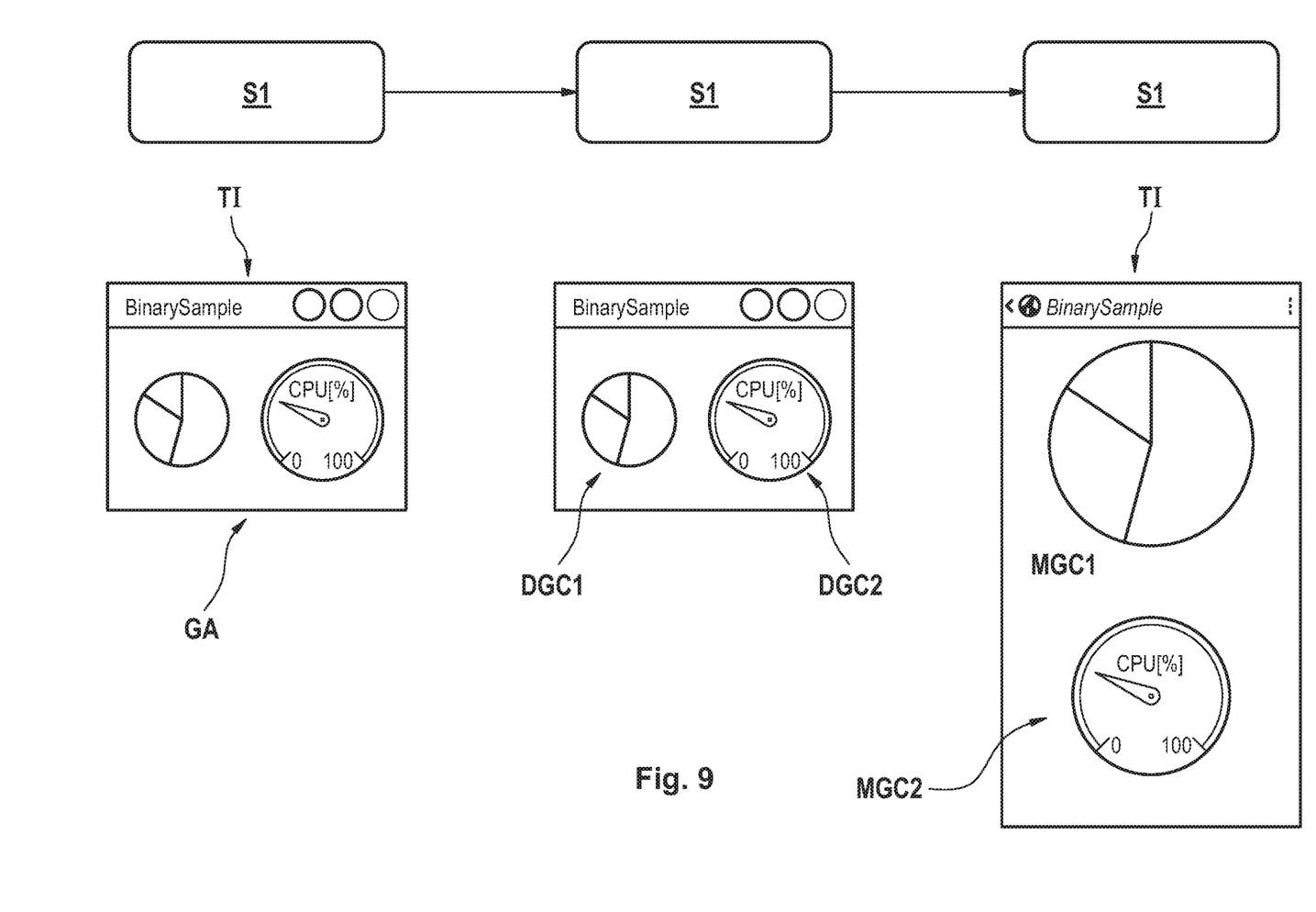
FIG. 9 shows method steps for the transformation of a desktop graphic component into a corresponding mobile device graphic component such as an image element of the mobile application.

FIG. 9 shows method steps S1 to S4 for the transformation of a desktop graphic component having the image components DGC1 and DGC2 of the graphic user interface DUI of the desktop application DA. In method step S1, the title TI "binary sample" and the content area GA are identified In method step S2, the content area GA is analyzed and the image components DGC1 and DGC2 are recognized. The mobile device main menu PNP is generated from the title TI "Binary Sample" of the desktop application, i.e., an empty application in which the corresponding image elements MGC1 and MGC2 are displayed.

The invention claimed is:

1. A computer-implemented method for generating a mobile application having an interactive graphic user interface displayable on a display screen of a mobile device from a desktop application executed on a data processing device, the method comprising:
   capturing individual data of a graphic user interface of the desktop application;
   analyzing the data and dividing the data into desktop image components;
   analyzing the desktop image components and capturing items of property information of the desktop image components;
   transforming the desktop image components by mapping them onto predefined equivalent executable mobile device components, which are adapted to the size of the display screen of the mobile device, using the items of property information;
   generating the executable graphic user interface of the mobile application from the associated mobile device components;
   capturing a user interaction with one of the executable mobile device components;
   capturing the individual data in a form of video images from a video stream of the graphic user interface of the desktop application using a streaming client;
   analyzing the video images of the video stream using pattern recognition and dividing the video images into the desktop image components;
   capturing the items of property information of the desktop image components including image coordinates of the associated desktop image component at the desktop application;
   transforming the user interaction into the image coordinates of the associated desktop image components at the desktop application using an event emitter tool; and
   transmitting the image coordinates for execution of the associated desktop component to the desktop application;
   executing the user interaction at the location of the image coordinates of the associated desktop component at the desktop application; and
   generating an updated or new executable mobile device component for the mobile application in running operation from an updated image of the video stream as a reaction to the user interaction.

2. The method according to claim 1, wherein the video image is divided into desktop content areas in the form of application frames, menu areas, text areas, tree structure areas, list structure areas, and/or graphic areas as desktop image components, and user-manipulable desktop control components scrollbars, toolbars, menu bars, and/or dialogue boxes, user-manipulable dynamic desktop function components are identified as desktop image components in each of the desktop content areas.

3. The method according to claim 1, wherein the items of property information of the desktop image component determined during the pattern recognition contain items of information about a type, a status, a designation, a text area, a chronological status change, and/or a precise size of the representation of the desktop image component on the desktop display screen.

4. The method according to claim 2, wherein the user-manipulable desktop control components are selected from the group consisting of image symbols for files and programs, buttons, scrollbars, toolbars, menu bars, and dialogue boxes.

5. The method according to claim 2, wherein the user-manipulable dynamic desktop control components are selected from the group consisting of tree structures, list structures, and static desktop graphic components.

6. The method according to claim 2, wherein, in a first step of the image analysis, the desktop content area is identified in the form of an application frame having application title, in a second step, the desktop control, desktop function, and/or desktop graphic element is identified in the desktop content area, in a third step, the application frame having application title is transformed into an equivalent mobile device application frame having application title, and, in a fourth step, the identified desktop control, desktop function, and/or desktop graphic element is transformed into an equivalent executable mobile device control, mobile device function, and/or mobile device graphic element.

7. The method according to claim 1, wherein the desktop image components identified by pattern recognition are mapped by moans using a mapping file in consideration of the items of pattern recognition information and/or property information onto the predefined mobile device components.

8. The method according to claim 7, wherein the mapping file is a mapping matrix.

9. The method according to claim 1, wherein the predefined mobile device components are prepared in the form of source code templates from basic image components, which are identified during an image analysis of images of various states of the graphic user interface of the desktop application.

10. The method according to claim 1, wherein the items of pattern recognition information and/or property information are provided by a configuration file and are loaded therefrom for a manual analysis and/or transformation and/or generation of unknown desktop image elements.

11. The method according to claim 1, wherein the analysis of the images, the transformation of the desktop image components, and/or generation of the mobile application are executed using a processor unit in a computer device, a cloud environment, or in the mobile device itself.

12. A data processing system for generating a mobile application having an interactive graphic user interface displayable on a display screen of a mobile device from a desktop application executed on a data processing device, the system comprising:
 a capture unit for capturing individual data of a graphic user interface of the desktop application using an analysis unit for analyzing the data and for dividing the data into desktop image components, for capturing items of property information of the desktop image components, and for transforming the desktop image components by mapping the desktop image components onto predefined equivalent executable mobile device components, which are adapted to the size of the display screen of the mobile device, using the items of property information;
 a generator unit for generating the executable graphic user interface of the mobile application from the associated mobile device components;
 a capture unit for capturing a user interaction with one of the executable mobile device components, for transforming the user interaction for execution of the associated desktop component to the desktop application;
 wherein the capture unit is a streamer client which is able to capture the individual data in a form of video images from a video stream of the graphic user interface of the desktop application;
 wherein the analysis unit is an image analysis unit which is able to analyze the video images using a pattern recognition, for dividing the images into the desktop image components, for analyzing the desktop image components using the pattern recognition;
 wherein the capturing of items of information includes capturing image coordinates of the associated desktop image component of the desktop application;
 wherein the capture unit is an event emitter tool for capturing the user interaction; and
 wherein, as a reaction to the user interaction, an updated or new executable mobile device component for the mobile application is generated in running operation from an updated video image of the video stream.

13. The system according to claim 12, wherein the data processing system is installed in the mobile device.

14. The system according to claim 12, wherein the data processing system is installed in a cloud environment.

* * * * *